United States Patent
Ner et al.

(10) Patent No.: US 10,652,930 B2
(45) Date of Patent: May 12, 2020

(54) DYNAMIC CONGESTION CONTROL ALGORITHM SELECTION IN A PROXY DEVICE

(71) Applicant: Verizon Patent and Licensing Inc., Arlington, VA (US)

(72) Inventors: Haim S. Ner, Fair Lawn, NJ (US); Feng Li, Lexington, MA (US); Eduard Rubinshtein, Belmont, MA (US); Jae Won Chung, Lexington, MA (US); Bjorn Olof Erland Kalderen, South Orange, NJ (US); Damascene M. Joachimpillai, Westford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/811,287

(22) Filed: Nov. 13, 2017

(65) Prior Publication Data

US 2019/0150027 A1    May 16, 2019

(51) Int. Cl.
*H04L 12/801* (2013.01)
*H04W 28/02* (2009.01)
*H04W 74/08* (2009.01)
*H04W 24/08* (2009.01)

(52) U.S. Cl.
CPC .......... *H04W 74/085* (2013.01); *H04L 47/11* (2013.01); *H04L 47/127* (2013.01); *H04W 28/0231* (2013.01); *H04W 28/0289* (2013.01); *H04L 47/14* (2013.01); *H04L 47/193* (2013.01); *H04W 24/08* (2013.01)

(58) Field of Classification Search
None
See application file for complete search history.

(56) References Cited

U.S. PATENT DOCUMENTS

| 2008/0065746 | A1* | 3/2008 | Moghaddam | H04L 63/0245 709/220 |
| 2009/0316581 | A1* | 12/2009 | Kashyap | H04L 45/28 370/236 |
| 2014/0029420 | A1* | 1/2014 | Jeong | H04L 12/5692 370/229 |
| 2014/0075567 | A1* | 3/2014 | Raleigh | H04W 12/10 726/26 |
| 2014/0157381 | A1* | 6/2014 | Disraeli | G06F 21/31 726/7 |
| 2015/0245224 | A1* | 8/2015 | Ahuja | H04L 67/2823 455/456.5 |
| 2015/0334593 | A1* | 11/2015 | Chen | H04L 47/2491 370/235 |

(Continued)

*Primary Examiner* — Kodzovi Acolatse
*Assistant Examiner* — The Hy Nguyen

(57) ABSTRACT

A system can receive an indication associated with establishing a transmission control protocol (TCP) connection. The system can determine, based on the indication, information that identifies a user device associated with the TCP connection. The system can determine, based on the information that identifies the user device, a predicted congestion level of a base station associated with the TCP connection. The system can select, based on the predicted congestion level, a congestion control algorithm to be implemented for the TCP connection. The system can cause the TCP connection to be established and implement the congestion control algorithm for the TCP connection.

20 Claims, 7 Drawing Sheets

(56) References Cited

U.S. PATENT DOCUMENTS

| | | | | |
|---|---|---|---|---|
| 2017/0099604 A1* | 4/2017 | Raleigh | ................. | H04W 12/12 |
| 2017/0289838 A1* | 10/2017 | Agrawal | ........... | H04W 28/0273 |
| 2018/0132110 A1* | 5/2018 | Furuichi | ............ | H04L 43/0894 |
| 2018/0139642 A1* | 5/2018 | Yoshida | ................. | H04W 88/18 |
| 2019/0052565 A1* | 2/2019 | Modi | ...................... | H04L 47/11 |

* cited by examiner

DYNAMIC CONGESTION CONTROL ALGORITHM SELECTION IN A PROXY DEVICE

BACKGROUND

Network congestion can negatively impact performance of a network by, for example, causing queueing delay, packet loss, blocking of connections, decreased throughput, and/or the like. A congestion control algorithm can be implemented in the network in order to control and/or avoid such network congestion. For example, a congestion control algorithm can be implemented at a transmission control protocol (TCP) layer in order to provide congestion control in the network. Such TCP congestion control algorithms include, for example, TCP CUBIC, TCP Westwood+, TCP DataCenter, TCP (bottleneck bandwidth and round-trip propagation time) BBR, TCP Wireless Rate Control (WRC), and many more.

DETAILED DESCRIPTION OF PREFERRED EMBODIMENTS

The following detailed description of example implementations refers to the accompanying drawings. The same reference numbers in different drawings can identify the same or similar elements.

A congestion control algorithm can be implemented in the network in order to control and/or avoid network congestion. For example, a congestion control algorithm can be implemented by a proxy device, associated with a TCP connection, in order to provide congestion control associated with a wireless network, such as a long term evolution (LTE) network, utilized by the TCP connection.

In some cases, however, the proxy device can be configured to implement the same congestion control algorithm for each TCP connection supported by the proxy device. This lack of flexibility can negatively impact performance of the network. For example, if a cell of the wireless network that supports the TCP connection is congested, then a first congestion control algorithm (e.g., TCP WRC) can behave aggressively in terms of retransmission behavior, thereby exacerbating the network congestion. Thus, in a case where the proxy device is configured to implement only the first congestion control algorithm, network congestion cannot be reduced by implementing the congestion control algorithm and, in fact, can be worsened. Conversely, if a second congestion control algorithm, known to perform comparatively better under congested cell conditions (e.g., TCP CUBIC), were implemented by the proxy device, then network congestion can be reduced. However, the second congestion control algorithm can be known to perform comparatively worse than the first congestion control algorithm in comparatively less congested cell conditions and, therefore, would not be desirable to implement for all TCP connections.

Moreover, even in a case where a proxy device is capable of selecting one of multiple congestion control algorithms for implementation in a TCP connection, such selection is based on, for example, packet round-trip times (RTTs). In other words, in such cases, selection of the congestion control algorithm is not based on congestion, associated with a base station, at the cell-level or the sector-level.

Some implementations described herein provide techniques for dynamically selecting a congestion control algorithm, associated with a TCP connection, based on a predicted congestion level of a base station associated with the TCP connection.

Figure 1A:
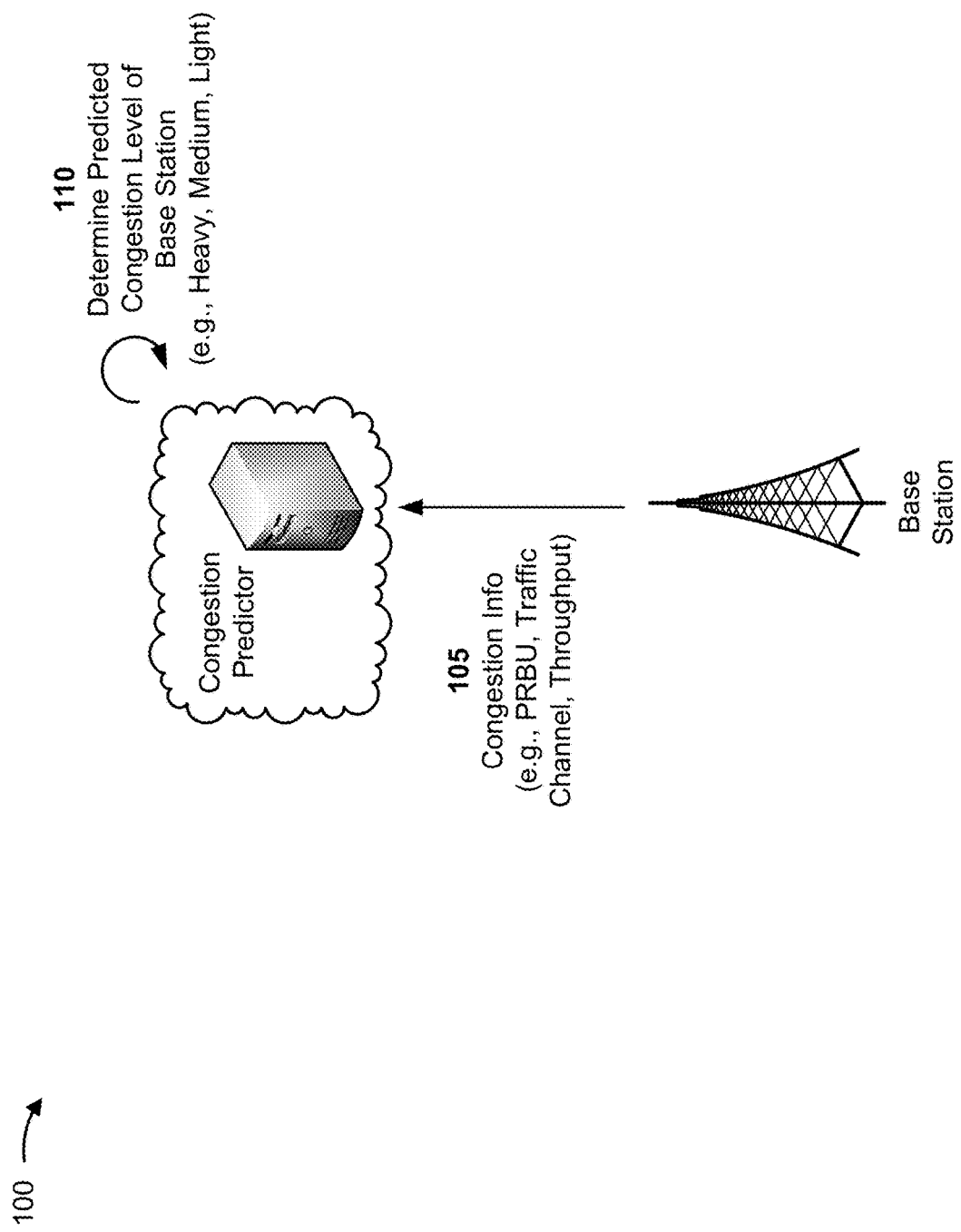
FIGS. 1A and 1B are diagrams of an overview of an example implementation described herein.
Figure 1B:
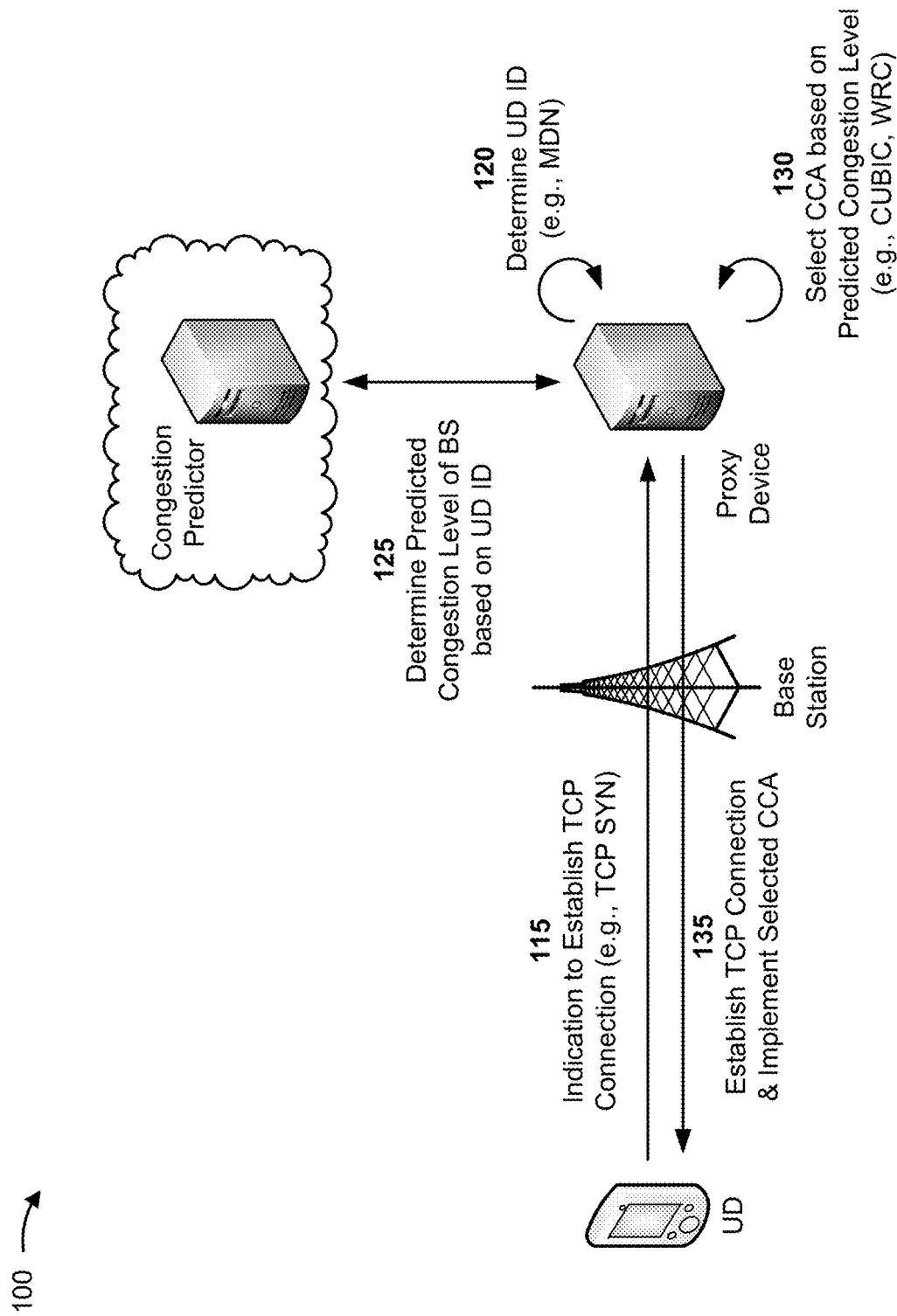

FIGS. 1A and 1B are diagrams of an overview of an example implementation 100 described herein.

As shown in FIG. 1A, and by reference number 105, a base station can provide congestion information, associated with the base station, to a congestion predictor associated with predicting a congestion level of the base station at a particular time or during a particular time period. The congestion information can include information associated with a load condition of the base station (e.g., physical resource block usage (PRBU) information associated with the base station, traffic channel information associated with the base station, throughput information associated with the base station, and/or the like) at the base station at a particular time or during a particular period of time, as described below.

As shown by reference number 110, the congestion predictor can determine, based on the congestion information, a predicted congestion level of the base station. In some implementations, the predicted congestion level can include information associated with a predicted level of congestion at the base station at a particular time or during a particular time period. For example, the predicted congestion level can include information that identifies a degree of congestion at the base station (e.g., light, medium, heavy, congested; green, yellow, or red; and/or the like), information that indicates whether the base station 210 is experiencing congestion (e.g., true, false; yes, no; and/or the like), a congestion score indicative of an amount of congestion (e.g., a numerical value from 1 to 100, a letter grade from A to F, and/or the like), as described below. In some implementations, the predicted congestion level can be associated with a particular time and/or a particular period of time. In some implementations, the congestion predictor can determine the predicted congestion level based on the congestion information associated with the base station and/or based on historical congestion information, associated with the base station, as described below.

In some implementations, the congestion predictor can store information associated with the predicted congestion level such that congestion predictor can determine the predicted congestion level of the base station at a later time, as described below.

As shown in FIG. 1B, and by reference number 115, a proxy device can receive an indication associated with establishing a TCP connection (e.g., a synchronize message associated with establishing a TCP connection). As shown by reference number 120, the proxy device can, based on receiving the indication, determine information that identifies the user device. In some implementations, the proxy device can determine the information that identifies the user device based on the indication (e.g., based on information included in the indication). The information that identifies the user device can include a mobile directory number (MDN) of the user device, a mobile identification number of the user device, a network address (e.g., an Internet protocol (IP) address) associated with the user device, and/or the like, as described below.

As shown by reference number 125, the proxy device can determine a predicted congestion level of the base station based on the information that identifies the user device. For example, the proxy device can provide, to the congestion predictor, a request for information associated with a predicted congestion level for a base station to which the user device is attached. Here, the congestion predictor can determine, based on information (e.g., stored or accessible by the congestion predictor) that maps information that identifies user devices to base stations to which the user devices are attached, information that identifies the base station. Next, the congestion predictor can determine, based on information associated with predicted congestion levels (e.g., stored by the congestion predictor) and the information that identifies the base station, the predicted congestion level of the base station, and can provide to the proxy device, information associated with the predicted congestion level. As shown, the proxy device can receive the information associated with the predicted congestion level from the congestion predictor.

As shown by reference number 130, the proxy device can select, based on the predicted congestion level of the base station, a congestion control algorithm to be implemented for the TCP connection. For example, the proxy device can compare the predicted congestion level and a congestion threshold (e.g., a congestion threshold configured on the proxy device), and can select the congestion control algorithm based on whether the predicted congestion level satisfies the congestion threshold, as described below.

As shown by reference number 135, the proxy device can cause the TCP connection to be established, and can implement the selected congestion control algorithm for the TCP connection. In this way, the proxy device can dynamically select a congestion control algorithm, associated with the TCP connection, based on the predicted congestion level of the base station associated with the TCP connection, which can improve network performance by, for example, facilitating implementation of a congestion control algorithm that is appropriate for a load condition at the base station.

As indicated above, FIGS. 1A and 1B are provided merely as examples. Other examples are possible and can differ from what was described with regard to FIGS. 1A and 1B.

Figure 2:
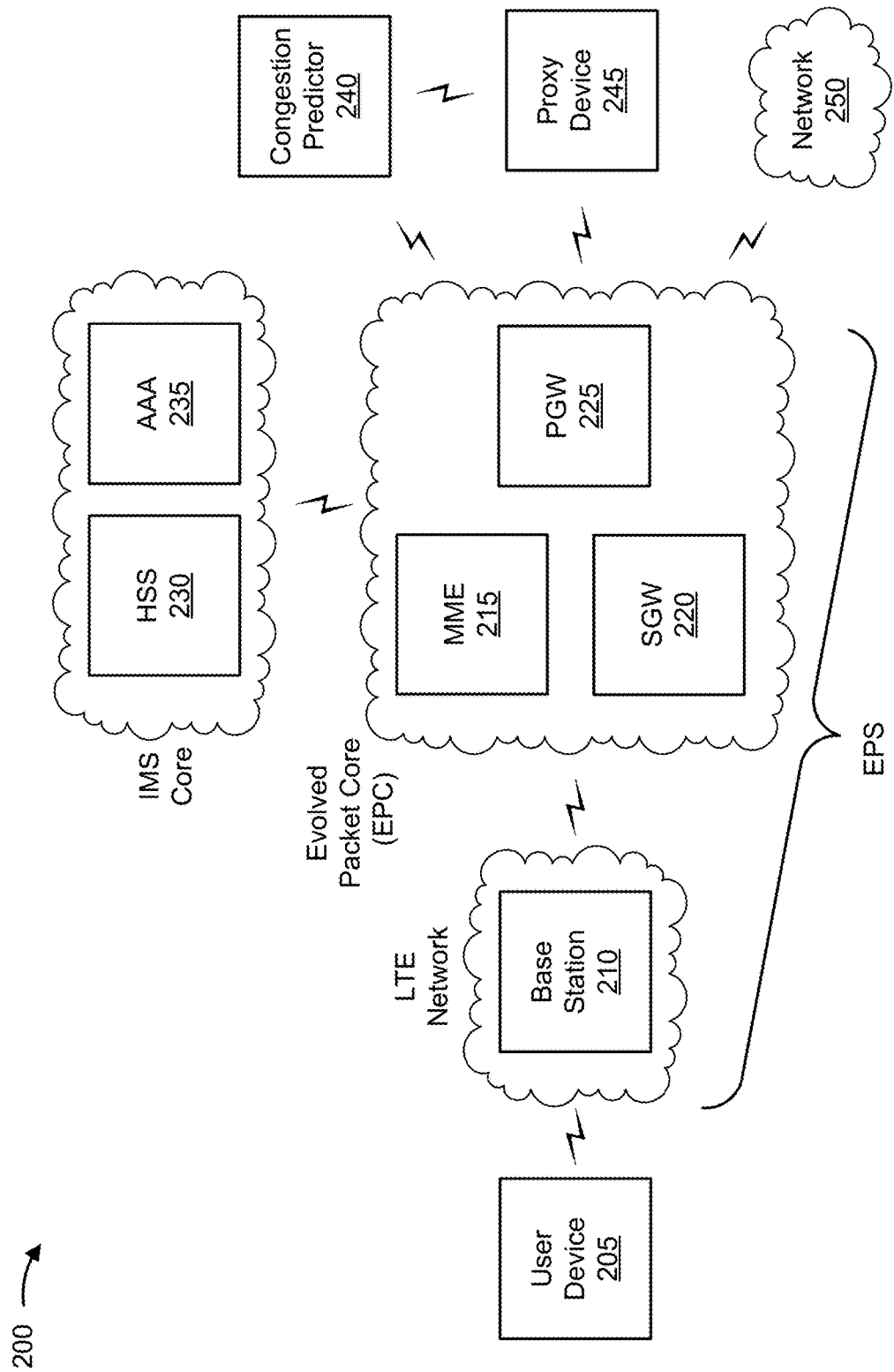
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 205, a base station 210, a mobility management entity device (MME) 215, a serving gateway (SGW) 220, a packet data network gateway (PGW) 225, a home subscriber server (HSS) 230, an authentication, authorization, and accounting server (AAA) 235, a congestion predictor 240, a proxy device 245, and a network 250. Devices of environment 200 can interconnect via wired connections, wireless connections, or a combination of wired and wireless connections.

Some implementations are described herein as being performed within a long term evolution (LTE) network for explanatory purposes. Some implementations can be performed within a network that is not an LTE network, such as a third generation (3G) network, a new radio (NR) network, and/or the like.

Environment 200 can include an evolved packet system (EPS) that includes an LTE network and/or an evolved packet core (EPC) that operate based on a third generation partnership project (3GPP) wireless communication standard. The LTE network can include a radio access network (RAN) that includes one or more base stations 210 that take the form of evolved Node Bs (eNBs) via which user device 205 communicates with the EPC. The EPC can include MME 215, SGW 220, and/or PGW 225 that enable user device 205 to communicate with network 250 and/or an Internet protocol (IP) multimedia subsystem (IMS) core. The IMS core can include HSS 230 and/or AAA 235, and can manage device registration and authentication, session initiation, etc., associated with user devices 205. HSS 230 and/or AAA 235 can reside in the EPC and/or the IMS core.

User device 205 includes one or more devices capable of communicating with base station 210 and/or a network (e.g., network 250). For example, user device 205 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, and/or a similar device. User device 205 can send traffic to and/or receive traffic from network 250 (e.g., via base station 210, SGW 220, and/or PGW 225).

Base station 210 includes one or more devices capable of transferring traffic, such as audio, video, text, and/or other traffic, destined for and/or received from user device 205. In some implementations, base station 210 can include an eNB associated with the LTE network that receives traffic from and/or sends traffic to network 250 via SGW 220 and/or PGW 225. Additionally, or alternatively, one or more base stations 210 can be associated with a RAN that is not associated with the LTE network. Base station 210 can send traffic to and/or receive traffic from user device 205 via an air interface. In some implementations, base station 210 can include a small cell base station, such as a base station of a microcell, a picocell, and/or a femtocell.

MME 215 includes one or more devices, such as one or more server devices, capable of managing authentication, activation, deactivation, and/or mobility functions associated with user device 205. In some implementations, MME 215 can perform operations relating to authentication of user device 205. Additionally, or alternatively, MME 215 can facilitate the selection of a particular SGW 220 and/or a particular PGW 225 to serve traffic to and/or from user device 205. MME 215 can perform operations associated with handing off user device 205 from a first base station 210 to a second base station 210 when user device 205 is transitioning from a first cell associated with the first base station 210 to a second cell associated with the second base station 210. Additionally, or alternatively, MME 215 can select another MME (not pictured), to which user device 205 should be handed off (e.g., when user device 205 moves out of range of MME 215).

SGW 220 includes one or more devices capable of routing packets. For example, SGW 220 can include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 can aggregate traffic received from one or more base stations 210 associated with the LTE network, and can send the aggregated traffic to network 250 (e.g., via PGW 225) and/or other network devices associated with the EPC and/or the IMS core. SGW 220 can also receive traffic from network 250 and/or other network devices, and can send the received traffic to user device 205 via base station 210. Additionally, or alternatively, SGW 220 can perform operations associated with handing off user device 205 to and/or from an LTE network.

PGW 225 includes one or more devices capable of providing connectivity for user device 205 to external packet data networks (e.g., other than the depicted EPC and/or LTE network). For example, PGW 225 can include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 can aggregate traffic received from one or more SGWs 220, and can send the aggregated traffic to network 250. Additionally, or alternatively, PGW 225 can receive traffic from network 250, and can send the traffic to user device 205 via SGW 220 and base station 210. PGW 225 can record data usage information (e.g., byte usage), and can provide the data usage information to AAA 235.

HSS 230 includes one or more devices, such as one or more server devices, capable of managing (e.g., receiving, generating, storing, processing, and/or providing) information associated with user device 205. For example, HSS 230 can manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, etc.), and/or similar information. HSS 230 can provide this information to one or more other devices of environment 200 to support the operations performed by those devices.

AAA 235 includes one or more devices, such as one or more server devices, that perform authentication, authorization, and/or accounting operations for communication sessions associated with user device 205. For example, AAA 235 can perform authentication operations for user device 205 and/or a user of user device 205 (e.g., using one or more credentials), can control access, by user device 205, to a service and/or an application (e.g., based on one or more restrictions, such as time-of-day restrictions, location restrictions, single or multiple access restrictions, read/write restrictions, etc.), can track resources consumed by user device 205 (e.g., a quantity of voice minutes consumed, a quantity of data consumed, etc.), and/or can perform similar operations.

Congestion predictor 240 includes one or more devices capable of determining a predicted congestion level, associated with base station 210, based on congestion information associated with base station 210, and providing information associated with the predicted congestion level for use in selecting a congestion control algorithm to be implemented for a TCP connection, as described herein. For example, congestion predictor 240 can include a server device or a group of server devices. In some implementations, congestion predictor 240 can include one or more devices hosted in a cloud computing environment and/or one or more devices that are not hosted in a cloud-computing environment.

Proxy device 245 includes one or more proxy devices capable of acting as a proxy for a TCP connection between user device 205 and another device (e.g., a device included in network 250) and selecting a congestion control algorithm to be implemented for the TCP connection. In some implementations, proxy device 245 can select the congestion control algorithm based on a predicted congestion level of a base station associated with the TCP connection, as described herein. For example, proxy device 245 can include a server, a group of servers, a router, a gateway, a switch, a firewall, a hub, a bridge, a reverse proxy, or any traffic transfer device.

Network 250 includes one or more wired and/or wireless networks. For example, network 250 can include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
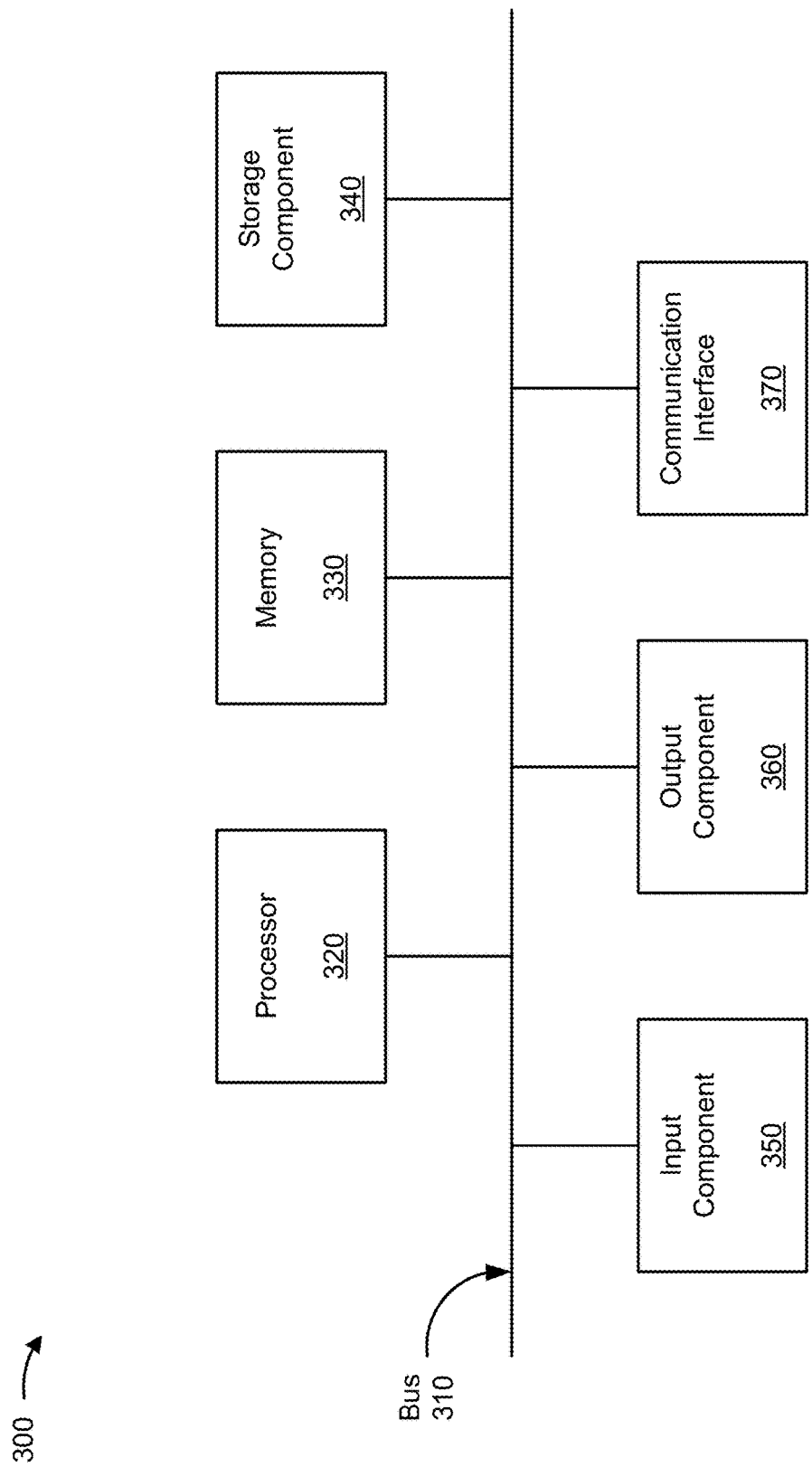
FIG. 3 is a diagram of example components of one or more devices of FIG. 2.

FIG. 3 is a diagram of example components of a device 300. Device 300 can correspond to user device 205, base station 210, MME 215, SGW 220, PGW 225, HSS 230, AAA 235, congestion predictor 240, and/or proxy device 245. In some implementations, user device 205, base station 210, MME 215, SGW 220, PGW 225, HSS 230, AAA 235, congestion predictor 240, and/or proxy device 245 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
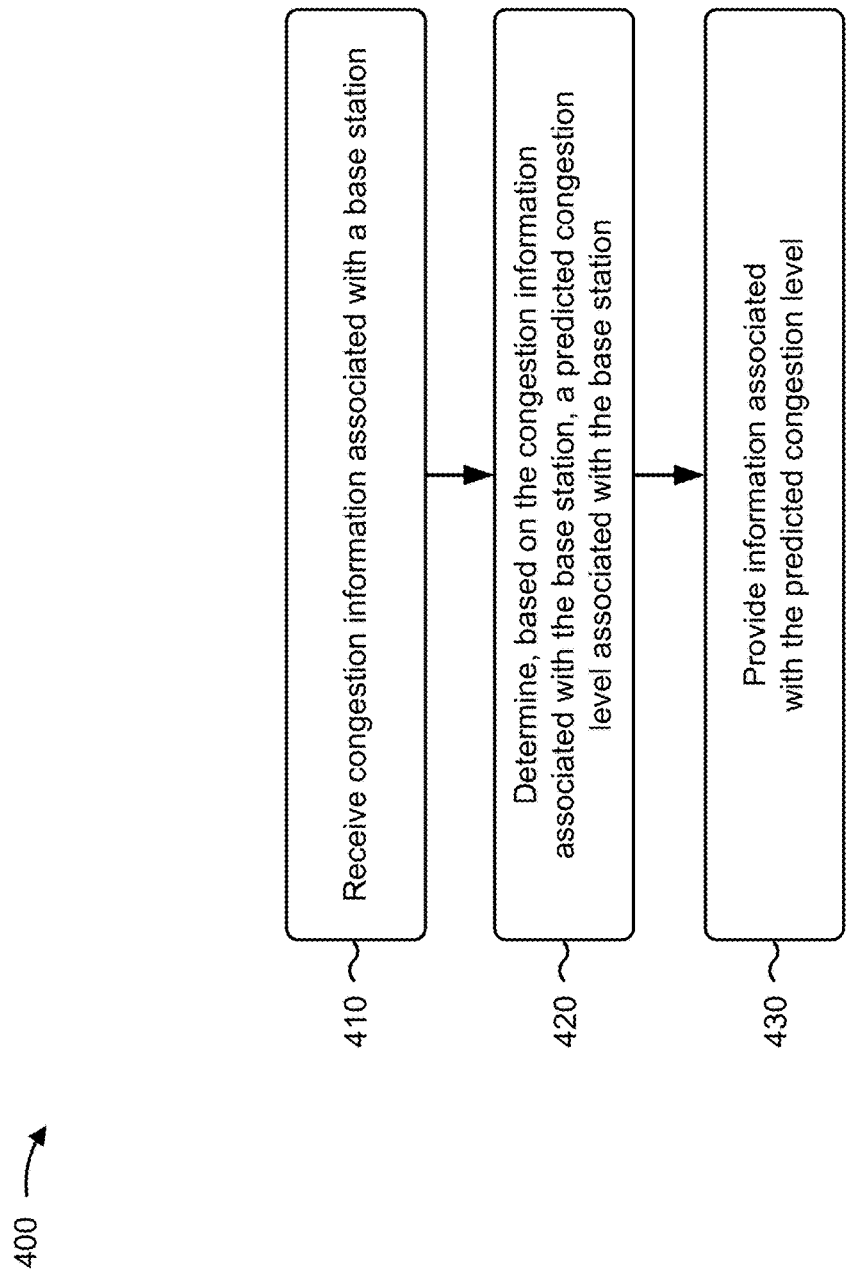
FIG. 4 is a flow chart of an example process for determining a predicted congestion level, associated with a base station, based on congestion information associated with the base station.

FIG. 4 is a flow chart of an example process 400 for determining a predicted congestion level, associated with a base station, based on congestion information associated with the base station. In some implementations, one or more process blocks of FIG. 4 can be performed by congestion predictor 240. In some implementations, one or more process blocks of FIG. 4 can be performed by another device or a group of devices separate from or including congestion predictor 240, such as proxy device 245 and/or another device shown in FIG. 2.

As shown in FIG. 4, process 400 can include receiving congestion information associated with a base station (block 410). For example, congestion predictor 240 can receive congestion information associated with base station 210.

The congestion information can include information associated with a load condition of base station 210. For example, the congestion information can include physical resource block usage (PRBU) information, associated with base station 210, that identifies an amount of physical resource blocks (e.g., a percentage of available physical resource blocks, a number of physical resource blocks, and/or the like) used for wireless communications at a particular time or during a particular period of time.

As another example, the congestion information can include traffic channel information, associated with base station 210, that identifies a number of traffic channels (e.g., a number of open traffic channels) used for wireless communications at a particular time or during a particular period of time.

As still another example, the congestion information can include throughput information, associated with base station 210, that identifies an amount of throughput (e.g., an average downlink (DL) throughput, an average uplink (UL) throughput, a maximum DL throughput, a maximum UL throughput, a minimum DL throughput, a minimum UL throughput) at base station 210 at a particular time or during a particular period of time.

In some implementations, the congestion information can include a timestamp that identifies a time (e.g., a time of day, a date, a day of the week, a time window, and/or the like) corresponding to the congestion information (e.g., a time at which the congestion information was measured, determined, observed, and/or the like).

In some implementations, the congestion information can include an identifier associated with base station 210. For example, the identifier can include information that identifies base station 210 (e.g., an eNodeBID, a base station identification number, a base station name, and/or the like), information that identifies a cell associated with the congestion information (e.g., a CellID, a cell identification number, a cell name, and/or the like), information that identifies a sector associated with the congestion information (e.g., a sector identification number, a sector name, and/or the like), or another type of information that can be used to associate the congestion information to base station 210.

In some implementations, congestion predictor 240 can receive the congestion information from base station 210. For example, base station 210 can be configured to (e.g., automatically) provide congestion information, associated with base station 210, in real-time or near real-time (e.g., as base station 210 determines, measures, and/or observes the congestion information) on a periodic basis (e.g., once an hour, once a day, and/or the like), and congestion predictor 240 can receive the congestion information from base station 210, accordingly. As another example, congestion predictor 240 can provide (e.g., automatically, based on user input, and/or the like), to base station 210, a request to provide the congestion information, and base station 210 can provide the congestion information to congestion predictor 240 in response to the request.

In some implementations, congestion predictor 240 can store the congestion information. In this way, congestion predictor 240 can maintain access to historical (e.g., previously received) congestion information, associated with base station 210, where each item of congestion information can correspond to a different particular time and/or a different particular period of time. In some implementations, congestion predictor 240 can determine, based on this stored congestion information, a predicted congestion level of base station 210, as described below.

In some implementations, congestion predictor 240 can receive congestion information associated with multiple base stations 210, and can store the congestion information such that congestion predictor 240 can retrieve congestion information, associated with a particular base station 210, based on an identifier associated with the particular base station 210 (i.e., such that congestion predictor 240 can retrieve stored congestion information, associated with the particular base station 210, based on the identifier associated with the particular base station 210).

As further shown in FIG. 4, process 400 can include determining, based on the congestion information associated with the base station, a predicted congestion level associated with the base station (block 420). For example, congestion predictor 240 can determine, based on the congestion information associated with base station 210, a predicted congestion level associated with base station 210.

The predicted congestion level of base station 210 includes information associated with a predicted level of congestion at base station 210 at a particular time or during a particular time period. For example, the predicted congestion level can include information that identifies a degree of congestion at base station 210 (e.g., light, medium, heavy, congested; green, yellow, or red; and/or the like), information that indicates whether base station 210 is experiencing congestion (e.g., true, false; yes, no; and/or the like), a congestion score indicative of an amount of congestion (e.g., a numerical value from 1 to 100, a letter grade from A to F, and/or the like), and/or another type of information that indicates a degree of congestion at base station 210.

In some implementations, the predicted congestion level can be associated with a particular time and/or a particular period of time. For example, the predicted congestion level can be a predicted congestion level for a particular time of day (e.g., 12:00 p.m.), a particular period of time (e.g., 3:00 p.m. to 5:00 p.m.), a particular day of the week (e.g., Monday, Saturday, and/or the like), a particular range of days (e.g., Monday through Friday, a weekend, and/or the like), a particular date (e.g., October 12), a particular range of dates (e.g., September 15 through 22, and/or the like), or some combination thereof.

In some implementations, base station 210 can determine the predicted congestion level based on the congestion information associated with base station 210. For example, congestion predictor 240 can store or have access to congestion information, associated with base station 210, as described above. Here, assume that congestion predictor 240 is configured to determine a predicted congestion level of base station 210 at 12:00 p.m. on a weekday. In this example, congestion predictor 240 can determine (e.g., based on congestion information stored by congestion predictor 240) congestion information, associated with base station 210, for one or more previous weekdays (e.g., a most recent 30 weekdays) at or near 12:00 p.m. (e.g., within 30 minutes of 12:00 p.m.). Here, congestion predictor 240 can determine the predicted congestion level, associated with base station 210, as an average, a weighted average, a mean, a median, and/or the like, of the congestion information associated with the one or more previous weekdays at or near 12:00 p.m. As a particular example, congestion predictor 240 can determine whether PRBU at base station 210 was in a range associated with heavy congestion (e.g., from greater than or equal 60% PRBU to 100% PRBU), a range associated with medium congestion (e.g., from greater than or equal to 15% PRBU to less than 60% PRBU), or a range associated with light congestion (e.g., from 0% PRBU to less than 15% PRBU) on each of the most recent 30 days at or near 12:00 p.m. In this example, congestion predictor 240 can determine the predicted congestion level as a congestion level (e.g., heavy, medium, or light) observed most frequently during the most recent 30 days at or near 12:00 p.m. Notably, the above example is provided for illustrative purposes, and other techniques for determining the predicted congestion level are possible.

In some implementations, congestion predictor 240 can determine the predicted congestion level based on one or more types of congestion information (e.g., PRBU information, traffic channel information, throughput information, and/or the like). Additionally, or alternatively, congestion predictor 240 can determine the predicted congestion level such that comparatively newer (i.e., more recent) congestion information is given more weight than comparatively older congestion information.

In some implementations, congestion predictor 240 can determine the predicted congestion level based on congestion information associated with base station 210, as described above. Additionally, or alternatively, base station 210 can determine the predicted congestion level based on congestion information associated with one or more other base stations 210 (e.g., one or more base stations 210 that are located near base station 210, one or more base stations 210 for which load conditions are expected to be similar to those of base station 210, and/or the like).

In some implementations, congestion predictor 240 can update the predicted congestion level associated with base station 210. For example, congestion predictor 240 can determine the predicted congestion level based on stored congestion information associated with base station 210, and can receive additional (e.g., recently measured) congestion information associated with base station 210. In this example, congestion predictor 240 can update (e.g., recalculate, reevaluate, and/or the like) the predicted congestion level based on the additional congestion information.

In some implementations, congestion predictor 240 can determine the predicted congestion level based on receiving the congestion information. For example, congestion predictor 240 can be configured to (e.g., automatically) determine a predicted congestion level, or update a previously determined predicted congestion level, associated with base station 210, when congestion predictor 240 receives the congestion information associated with base station 210. In this way, congestion predictor 240 can maintain (e.g., in real-time or near real-time) an up-to-date predicted congestion level associated with base station 210.

Additionally, or alternatively, congestion predictor 240 can determine the predicted congestion level based on a request from another device, such as proxy device 245. For example, proxy device 245 can send, to congestion predictor 240, a request for a predicted congestion level associated with base station 210. Here, congestion predictor 240 can determine the predicted congestion level, associated with base station 210, based on the request.

Additionally, or alternatively, congestion predictor 240 can determine the predicted congestion level periodically (e.g., once a day, once a week, and/or the like). Additionally, or alternatively, congestion predictor 240 can determine the predicted congestion level based on user input indicating that congestion predictor 240 is to determine the predicted congestion level.

As further shown in FIG. 4, process 400 can include providing information associated with the predicted congestion level (block 430). For example, congestion predictor 240 can provide information associated with the predicted congestion level.

In some implementations, congestion predictor 240 can provide information associated with the predicted congestion level such that the information associated with the predicted congestion level is stored by congestion predictor 240. In some implementations, congestion predictor 240 can store an association between the predicted congestion level and the identifier associated with base station 210 in order to allow congestion predictor 240 to determine the predicted congestion level, associated with base station 210, at a later time, as described below.

Additionally, or alternatively, congestion predictor 240 can provide the information associated with the predicted congestion level to another device, such as proxy device 245. For example, after determining the predicted congestion level, congestion predictor 240 can provide the information associated with the predicted congestion level to proxy device 245 in order to allow proxy device 245 to select a congestion control algorithm, to be implemented for a TCP connection associated with base station 210, based on the predicted congestion level of base station 210.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
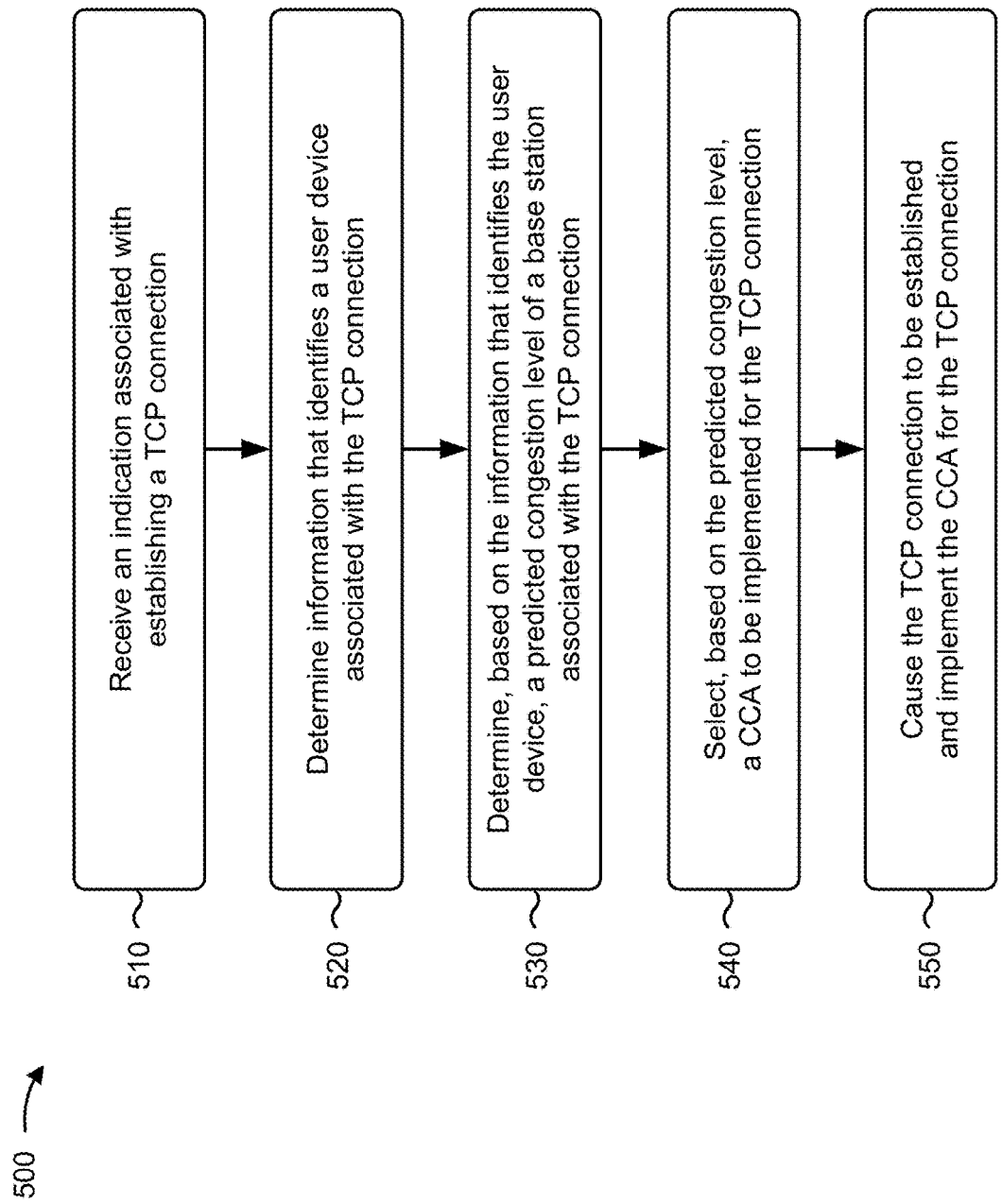
FIG. 5 is a flow chart of an example process for selecting, based on a predicted congestion level associated with a base station, a congestion control algorithm to be implemented for a TCP connection.

FIG. 5 is a flow chart of an example process 500 for selecting, based on a predicted congestion level associated with a base station, a congestion control algorithm to be implemented for a TCP connection. In some implementations, one or more process blocks of FIG. 5 can be performed by proxy device 245. In some implementations, one or more process blocks of FIG. 5 can be performed by another device or a group of devices separate from or including proxy device 245, such as congestion predictor 240 and/or another device shown in FIG. 2.

As shown in FIG. 5, process 500 can include receiving an indication associated with establishing a TCP connection (block 510). For example, proxy device 245 can receive an indication associated with establishing a TCP connection.

In some implementations, the indication can be a message (e.g., a synchronize (SYN) message) associated with establishing a TCP connection with proxy device 245 (e.g., a TCP connection between user device 205 and proxy device 245). In some implementations, proxy device 245 can receive the indication when (e.g., after) user device 205 provides the message (e.g., upon determining that the TCP connection is to be established).

As further shown in FIG. 5, process 500 can include determining information that identifies a user device associated with the TCP connection (block 520). For example, proxy device 245 can determine information that identifies user device 205 associated with the TCP connection.

The information that identifies user device 205 can include, for example, a mobile directory number (MDN) of user device 205, a mobile identification number (MIN) of user device 205, a network address (e.g., an Internet protocol (IP) address) associated with user device 205, and/or another type of information.

In some implementations, proxy device 245 can determine the information that identifies user device 205 based on the indication associated with establishing the TCP connection, as described below. For example, in some implementations, proxy device 245 can be configured to determine the predicted congestion level of base station 210 based on a MDN of user device 205. In such a case, proxy device 245 can determine an IP address, associated with user device 205, based on the indication associated with establishing the TCP connection (e.g., based on a source IP address included in the indication). User device 205 can then determine the MDN based on the IP address. For example, proxy device 245 can store or have access to information that maps IP addresses, assigned to user devices 205, to MDNs of user device 205, and proxy device 245 can determine the MDN of user device 205 based on the IP address (e.g., based on a lookup using the IP address).

As another example, in some implementations, proxy device 245 can be configured to determine the predicted congestion level of base station 210 based on an IP address of user device 205, as described below. In such a case, proxy device 245 can determine the IP address, associated with user device 205, based on the indication associated with establishing the TCP connection (e.g., based on a source IP address included in the indication).

As further shown in FIG. 5, process 500 can include determining, based on the information that identifies the user device, a predicted congestion level of a base station associated with the TCP connection (block 530). For example, proxy device 245 can determine, based on the information that identifies user device 205, a predicted congestion level of base station 210 associated with the TCP connection (e.g., base station 210 to which user device 205 is attached and via which the TCP connection is to be supported).

The predicted congestion level of base station 210 includes information associated with a predicted level of congestion at base station 210 at a particular time or during a particular time period, as described above.

In some implementations, proxy device 245 can determine the predicted congestion level of base station 210 based on information provided by congestion predictor 240. For example, proxy device 245 can provide, to congestion predictor 240, the information that identifies user device 205 in a request for a predicted congestion level of base station 210 associated with user device 205. Here, congestion predictor 240 can determine, based on information stored or accessible by congestion predictor 240, information that identifies base station 210 to which user device 205 is attached (i.e., base station 210 that is to support the TCP connection). Congestion predictor 240 can then determine the predicted congestion level of base station 210 based on information associated with the predicted congestion level (e.g., stored by congestion predictor 240 in the manner described above), and can provide information associated with the predicted congestion level to proxy device 245.

In some implementations, as in the above example, congestion predictor 240 can store or have access to information that maps information that identifies user devices 205 (e.g., MDNs, IP addresses, and/or the like) to base stations 210 to which the user devices 205 are attached. Additionally, or alternatively, proxy device 245 can store or have access to such information. In such a case, proxy device 245 can determine the information that identifies base station 210, and request the predicted congestion level from congestion predictor 240 based on information that identifies base station 210 (e.g., rather than based on the information that identifies user device 205).

In some implementations, congestion predictor 240 and/or proxy device 245 can determine the predicted congestion level based on a timestamp (e.g., information that identifies a time, a date, a day of the week, and/or the like, of the request for the predicted congestion level or of the indication associated with establishing the TCP connection). For example, congestion predictor 240 can determine predicted congestion levels, associated with base station 210, for a particular time of day, a particular period of time, a particular day of the week, a particular range of days, a particular date, a particular range of dates, or some combination thereof, and/or the like, as described above. In such a case, congestion predictor 240 can identify base station 210 associated with the TCP connection, as described above, and can determine the predicted congestion level of base station 210 based on the timestamp (e.g., by identifying a predicted congestion level for a particular period of time, a particular day of the week, a particular range of days, a particular date, a particular range of dates, or some combination thereof, that matches the timestamp within a threshold).

As further shown in FIG. 5, process 500 can include selecting, based on the predicted congestion level, a congestion control algorithm to be implemented for the TCP connection (block 540). For example, proxy device 245 can select, based on the predicted congestion level, a congestion control algorithm to be implemented for the TCP connection.

In some implementations, proxy device 245 can select the congestion control algorithm based on a congestion threshold. For example, proxy device 245 can compare the predicted congestion level and a congestion threshold (e.g., a threshold configured on proxy device 245), and can select the congestion control algorithm based on whether the predicted congestion level satisfies the threshold.

As a particular example, assume that the congestion threshold indicates that a first congestion control algorithm (e.g., TCP CUBIC) is to be selected when the predicted congestion level of base station 210 is heavy or congested, and that a second congestion control algorithm (e.g., TCP WRC) is to be selected when the predicted congestion level of base station 210 is medium or light. In this example, proxy device 245 can determine the predicted congestion level (e.g., light, medium, heavy, or congested), compare the predicted congestion level to the congestion threshold, and select the predicted congestion level accordingly.

As another particular example, assume that the congestion threshold indicates that a first congestion control algorithm is to be selected when the predicted congestion level is equal to or greater than a first predicted congestion level (e.g., when a congestion score is at least 70 on a scale of 1 to 100), that a second congestion control algorithm is to be selected when the predicted congestion level is less than the first predicted congestion level and is greater than or equal to a second predicted congestion level (e.g., when the congestion score is less than 70 and is greater than or equal to 30 on the scale of 1 to 100), and that a third congestion control algorithm is to be selected when the predicted congestion level is less than the second predicted congestion level (e.g., when the congestion score is less than 30). In this example, proxy device 245 can determine the predicted congestion level (e.g., the congestion score), compare the predicted congestion level to the first and/or second congestion thresholds, and select the predicted congestion level accordingly.

As further shown in FIG. 5, process 500 can include causing the TCP connection to be established and implement the congestion control algorithm for the TCP connection (block 550). For example, proxy device 245 can cause the TCP connection to be establish and implement the congestion control algorithm for the TCP connection.

In some implementations, proxy device 245 can cause the TCP connection to be established in a typical manner (e.g., by creating a new socket for the TCP connection and performing operations associated with a conventional socket handling procedure), and can implement the selected congestion control algorithm for the TCP connection.

In this way, proxy device 245 can dynamically select a congestion control algorithm, associated with a TCP connection, based on a predicted congestion level of base station 210 associated with the TCP connection. In some implementations, such selection of the congestion control algorithm can improve network performance by selecting a congestion control algorithm appropriate for a load condition at base station 210.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

Figure 6:
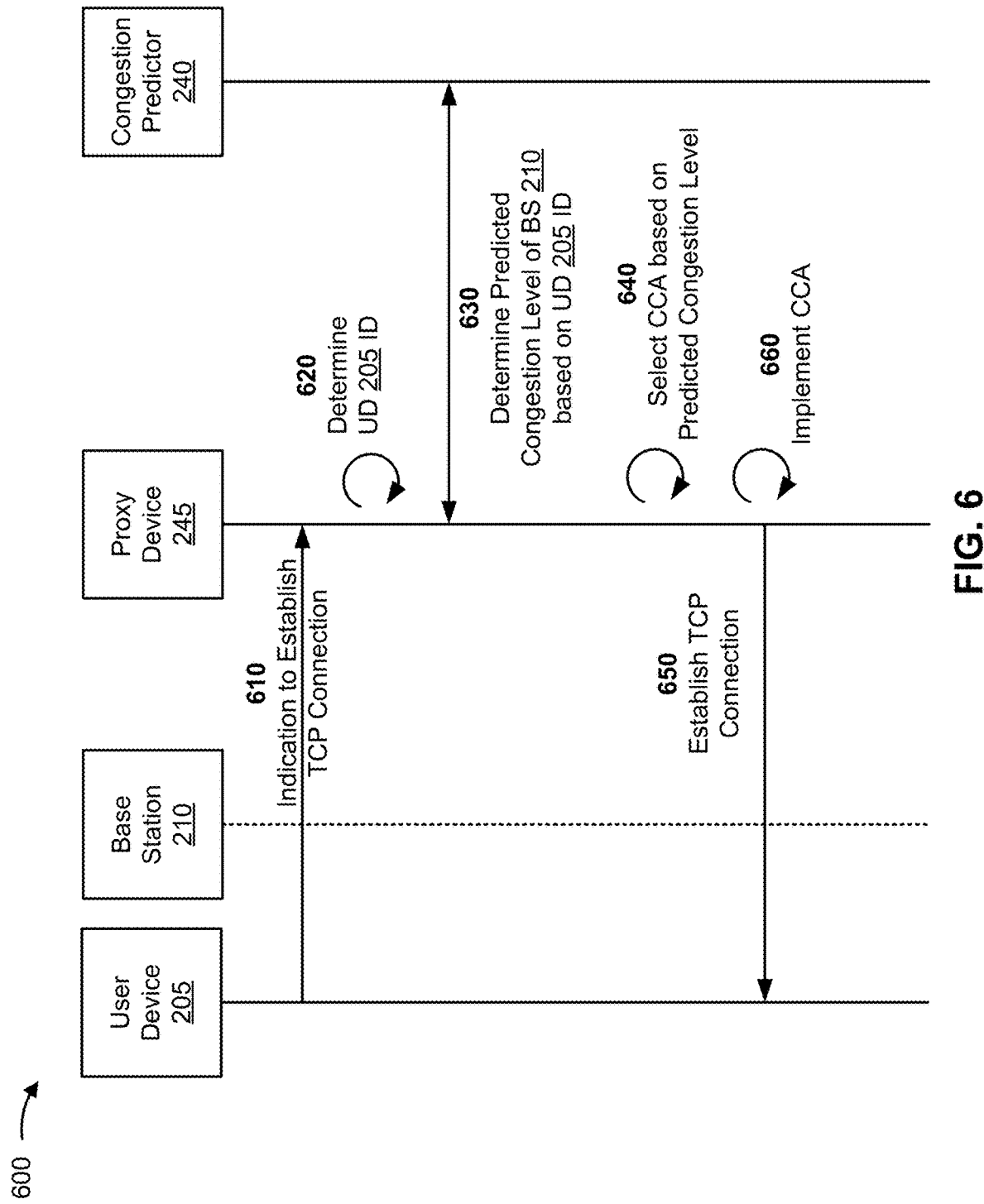
FIG. 6 is call flow diagram of an example process for selecting, based on a predicted congestion level associated with a base station, a congestion control algorithm to be implemented for a TCP connection.

FIG. 6 is a call flow diagram of an example call flow 600 for selecting, based on a predicted congestion level associated with a base station, a congestion control algorithm to be implemented for a TCP connection.

As shown in FIG. 6, and by reference number 610, proxy device 245 can receive an indication associated with establishing a TCP connection. For example, proxy device 245 can receive the indication, associated with establishing the TCP connection, from user device 205 (e.g., via base station 210), as described above.

As shown by reference number 620, proxy device 245 can determine information that identifies user device 205. For example, proxy device 245 can determine information that identifies user device 205 based on information included in the indication, as described above.

As shown by reference number 630, proxy device 245 can determine a predicted congestion level of base station 210 based on the information that identifies user device 205. For example, as described above, proxy device 245 provide, to congestion predictor 240, the information that identifies user device 205. Here, congestion predictor 240 can determine, based on mapping the information that identifies user device 205 to information that identifies base station 210 and based on predicted congestion levels stored by congestion predictor 240, the predicted congestion level of base station 210. Congestion predictor 240 can then provide information associated with the predicted congestion level to proxy device 245.

As shown by reference number 640, proxy device 245 can select a congestion control algorithm, to be implemented for the TCP connection, based on the predicted congestion level. For example, proxy device 245 can compare the predicted congestion level to a congestion threshold, and can select the congestion control algorithm based on whether the predicted congestion level satisfies the congestion threshold, as described above.

As shown by reference numbers 650 and 660, proxy device 245 can cause the TCP connection to be established between user device 205 and proxy device 245, and can implement the selected congestion control algorithm.

As indicated above, FIG. 6 is provided merely as an example. Other examples are possible and can differ from what was described with regard to FIG. 6.

Some implementations described herein provide techniques for dynamically selecting a congestion control algorithm, associated with a TCP connection, based on a predicted congestion level of base station 210 associated with the TCP connection.

The foregoing disclosure provides illustration and description, but is not intended to be exhaustive or to limit the implementations to the precise form disclosed. Modifications and variations are possible in light of the above disclosure or can be acquired from practice of the implementations. For example, while the techniques and implementations described herein are described in the context of TCP connections, these techniques and implementations can be used for another type of connection associated with another protocol.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
one or more devices to:
  receive an indication associated with establishing a transmission control protocol (TCP) connection;
  determine, based on the indication, information that identifies a user device associated with the TCP connection,
    the information that identifies the user device including an Internet protocol (IP) address associated with the user device;
  determine, based on a lookup associated with the IP address, a mobile device number (MDN) associated with the user device;
  provide, to a congestion prediction device, the information that identifies the user device in a request for a predicted congestion level associated with a base station associated with the TCP connection,
    the predicted congestion level of the base station associated with the TCP connection being determined based on mapping the MDN or IP address to information that identifies the base station,
    the predicted congestion level of the base station associated with the TCP connection being determined based on congestion information,
      the congestion information being based upon:
        a quantity of open traffic channels used for communication during a particular period of time associated with the base station, and
        throughput information associated with the base station, the congestion information being determined at the particular period of time;
  receive, from the congestion prediction device, the predicted congestion level;
  select, based on the predicted congestion level, a congestion control algorithm, of a plurality of congestion control algorithms, to be implemented for the TCP connection,
    a first congestion control algorithm, of the plurality of congestion control algorithms, being selected when the predicted congestion level is equal to or greater than a first predicted congestion level,
    a second congestion control algorithm, of the plurality of congestion control algorithms, being selected when the predicted congestion level is less than the first predicted congestion level and is equal to or greater than a second predicted congestion level, or
    a third congestion control algorithm, of the plurality of congestion control algorithms, being selected when the predicted congestion level is less than the second predicted congestion level; and
  cause the TCP connection to be established and implement the selected congestion control algorithm for the TCP connection.

2. The system of claim 1, where the one or more devices are further to:
receive the congestion information associated with the base station.

3. The system of claim 1, where the one or more devices are further to:
determine a timestamp associated with establishing the TCP connection; and determine the predicted congestion level based on the timestamp associated with the TCP connection.

4. The system of claim 1, where the one or more devices are further to:
determine whether the predicted congestion level satisfies a congestion threshold; and
where the one or more devices, when selecting the congestion control algorithm, are to:
select the congestion control algorithm based on whether the predicted congestion level satisfies the congestion threshold.

5. The system of claim 1, where the one or more devices are further to:
determine, based on the information that identifies the user device, the information that identifies the base station associated with the TCP connection; and
determine the predicted congestion level of the base station based on the information that identifies the base station.

6. A non-transitory computer-readable medium storing instructions, the instructions comprising:
one or more instructions that, when executed by one or more processors, cause the one or more processors to:
receive an indication associated with establishing a transmission control protocol (TCP) connection;
determine, based on the indication, information that identifies a user device associated with the TCP connection,
the information that identifies the user device including an Internet protocol (IP) address associated with the user device;
determine, based on a lookup associated with the IP address, a mobile device number (MDN) associated with the user device;
provide, to a congestion prediction device, information that identifies the user device in a request for a predicted congestion level associated with a base station associated with the TCP connection,
the predicted congestion level of the base station associated with the TCP connection being determined based on mapping the MDN or IP address to information that identifies the base station,
the predicted congestion level of the base station associated with the TCP connection being determined based on congestion information,
the congestion information being based upon:
a quantity of open traffic channels used for communication during a particular period of time associated with the base station, and
throughput information associated with the base station,
the congestion information being determined at the particular period of time;
receive, from the congestion prediction device, the predicted congestion level;
select, based on the predicted congestion level, a congestion control algorithm, of a plurality of congestion control algorithms, to be implemented for the TCP connection,
a first congestion control algorithm, of the plurality of congestion control algorithms, being selected when the predicted congestion level is equal to or greater than a first predicted congestion level,
a second congestion control algorithm, of the plurality of congestion control algorithms, being selected when the predicted congestion level is less than the first predicted congestion level and is equal to or greater than a second predicted congestion level, or
a third congestion control algorithm, of the plurality of congestion control algorithms, being selected when the predicted congestion level is less than the second predicted congestion level; and
cause the TCP connection to be established and implement the selected congestion control algorithm for the TCP connection.

7. The non-transitory computer-readable medium of claim 6, where the one or more instructions further cause the one or more processors to:
receive congestion information associated with the base station.

8. The non-transitory computer-readable medium of claim 6, where the one or more instructions further cause the one or more processors to:
determine a timestamp associated with establishing the TCP connection; and
determine the predicted congestion level based on the timestamp associated with the TCP connection.

9. The non-transitory computer-readable medium of claim 6, where the one or more instructions further cause the one or more processors to:
determine whether the predicted congestion level satisfies a congestion threshold; and
where the one or more instructions, when causing the one or processors to select the congestion control algorithm, cause the one or more processors to:
select the congestion control algorithm based on whether the predicted congestion level satisfies the congestion threshold.

10. The non-transitory computer-readable medium of claim 6, where the one or more instructions further cause the one or more processors to:
determine, based on the information that identifies the user device, the information that identifies the base station associated with the TCP connection, and
determine the predicted congestion level of the base station based on the information that identifies the base station.

11. A method, comprising:
receiving, by a system, an indication associated with establishing a transmission control protocol (TCP) connection;
determining, by the system and based on the indication, information that identifies a user device associated with the TCP connection,
the information that identifies the user device including an Internet protocol (IP) address associated with the user device;
determining, by the system and based on a lookup associated with the IP address, a mobile device number (MDN) associated with the user device;
providing, by the system and to a congestion prediction device, information that identifies the user device in a request for a predicted congestion level associated with a base station associated with the TCP connection,
the predicted congestion level of the base station associated with the TCP connection being determined based on mapping MDN or IP address to information that identifies the base station,
the predicted congestion level of the base station associated with the TCP connection being determined based on congestion information, the congestion information being based upon:
a quantity of open traffic channels used for communication during a particular period of time associated with the base station, and
throughput information associated with the base station,
the congestion information being determined at the particular period of time;
receiving, by the system and from the congestion prediction device, the predicted congestion level;
selecting, by the system and based on the predicted congestion level, a congestion control algorithm, of a plurality of congestion control algorithms, to be implemented for the TCP connection,
a first congestion control algorithm, of the plurality of congestion control algorithms, being selected when the predicted congestion level is equal to or greater than a first predicted congestion level,
a second congestion control algorithm, of the plurality of congestion control algorithms, being selected when the predicted congestion level is less than the first predicted congestion level and is equal to or greater than a second predicted congestion level, or
a third congestion control algorithm, of the plurality of congestion control algorithms, being selected when the predicted congestion level is less than the second predicted congestion level; and
causing, by the system, the TCP connection to be established and implementing the selected congestion control algorithm for the TCP connection.

12. The method of claim 11, further comprising:
receiving the congestion information associated with the base station.

13. The method of claim 11, further comprising:
determining a timestamp associated with establishing the TCP connection; and
determining the predicted congestion level based on the timestamp associated with the TCP connection.

14. The method of claim 11, further comprising:
determining whether the predicted congestion level satisfies a congestion threshold; and
where selecting the congestion control algorithm comprises:
selecting the congestion control algorithm based on whether the predicted congestion level satisfies the congestion threshold.

15. The method of claim 11, further comprising:
determining, based on the information that identifies the user device, the information that identifies the base station associated with the TCP connection; and
determining the predicted congestion level of the base station based on the information that identifies the base station.

16. The system of claim 1, where the one or more devices are further to:
update, in real-time or near real-time, the predicted congestion level based on receiving additional congestion information.

17. The non-transitory computer-readable medium of claim 6, where the one or more instructions further cause the one or more processors to:
update, in real-time or near real-time, the predicted congestion level based on receiving additional congestion information.

18. The method of claim 11, further comprising:
updating, in real-time or near real-time, the predicted congestion level based on receiving additional congestion information.

19. The system of claim 1, where the predicted congestion level includes:
a congestion score indicative of an amount of congestion at the base station.

20. The non-transitory computer-readable medium of claim 6, where the predicted congestion level includes:
a congestion score indicative of an amount of congestion at the base station.

* * * * *